(12) United States Patent
Booth

(10) Patent No.: US 7,278,013 B2
(45) Date of Patent: *Oct. 2, 2007

(54) APPARATUS HAVING A CACHE AND A LOOP BUFFER

(75) Inventor: Lawrence A. Booth, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 221 days.

This patent is subject to a terminal disclaimer.

(21) Appl. No.: 10/788,718

(22) Filed: Feb. 27, 2004

(65) Prior Publication Data

US 2005/0251669 A1 Nov. 10, 2005

Related U.S. Application Data

(63) Continuation of application No. 09/574,010, filed on May 19, 2000, now Pat. No. 6,757,817.

(51) Int. Cl.
G06F 12/00 (2006.01)
G06F 9/44 (2006.01)
G06F 15/82 (2006.01)
G06F 13/16 (2006.01)
G06F 12/02 (2006.01)

(52) U.S. Cl. ............ 712/241; 711/125; 711/138; 711/143; 711/144; 712/26; 712/27; 712/228; 712/237; 712/207; 712/245; 719/88.1

(58) Field of Classification Search ........ 711/125, 711/138, 143, 144, 133, 152, 163, 122, 213, 711/208; 712/26, 27, 205, 228, 241, 237
See application file for complete search history.

(56) References Cited

U.S. PATENT DOCUMENTS

| 5,353,426 | A | * | 10/1994 | Patel et al. | 711/118 |
| 5,958,040 | A | * | 9/1999 | Jouppi | 712/207 |
| 6,085,315 | A | * | 7/2000 | Fleck et al. | 712/241 |
| 6,154,814 | A | * | 11/2000 | Uesugi | 711/133 |
| 6,438,653 | B1 | * | 8/2002 | Akashi et al. | 711/128 |
| 6,535,583 | B1 | * | 3/2003 | Bobick et al. | 379/88.1 |

* cited by examiner

Primary Examiner—Reginald Bragdon
Assistant Examiner—Mehdi Namazi
(74) Attorney, Agent, or Firm—Kenneth J. Cool, P.C.

(57) ABSTRACT

Briefly, in accordance with one embodiment of the invention, a processor has a loop buffer and a cache that provides requested information to a processor core.

17 Claims, 4 Drawing Sheets

APPARATUS HAVING A CACHE AND A LOOP BUFFER

CROSS-REFERENCE TO RELATED APPLICATIONS

This application is a continuing application of, and claims priority under 35 U.S.C. § 120 to, U.S. application Ser. No. 09/574,010 filed under the same Title and inventor on May 19, 2000; now issued as U.S. Pat. No. 6,757,817.

BACKGROUND

In order to provide customers with products that have improved capabilities, it may be desirable to improve the performance of the processor within the product so that the product may operate faster or offer new features. One technique to improve the performance of a processor is to include a cache within the core of the processor. A cache may be used to pre-fetch instructions and/or data that the processor is likely to request in upcoming instruction cycles. When the processor requests an instruction or a piece of data, the request may be compared against a tag array to determine if the data requested is stored in the cache. If a match is found in the tag array, then a cache "hit" has occurred. Accordingly, the stored information or data may then be provided to the processor by the cache. If the requested information is not in the cache, then a cache "miss" has occurred and the information may have to be retrieved from other sources. Providing the information from a local cache is generally faster than retrieving the instructions or data from a slower memory source, such as a disk drive.

However, the improved performance that might be gained by using a cache often comes with the expense associated with increased power consumption and die size of the cache. Thus, there is a continuing need for better ways to improve the performance of processors.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
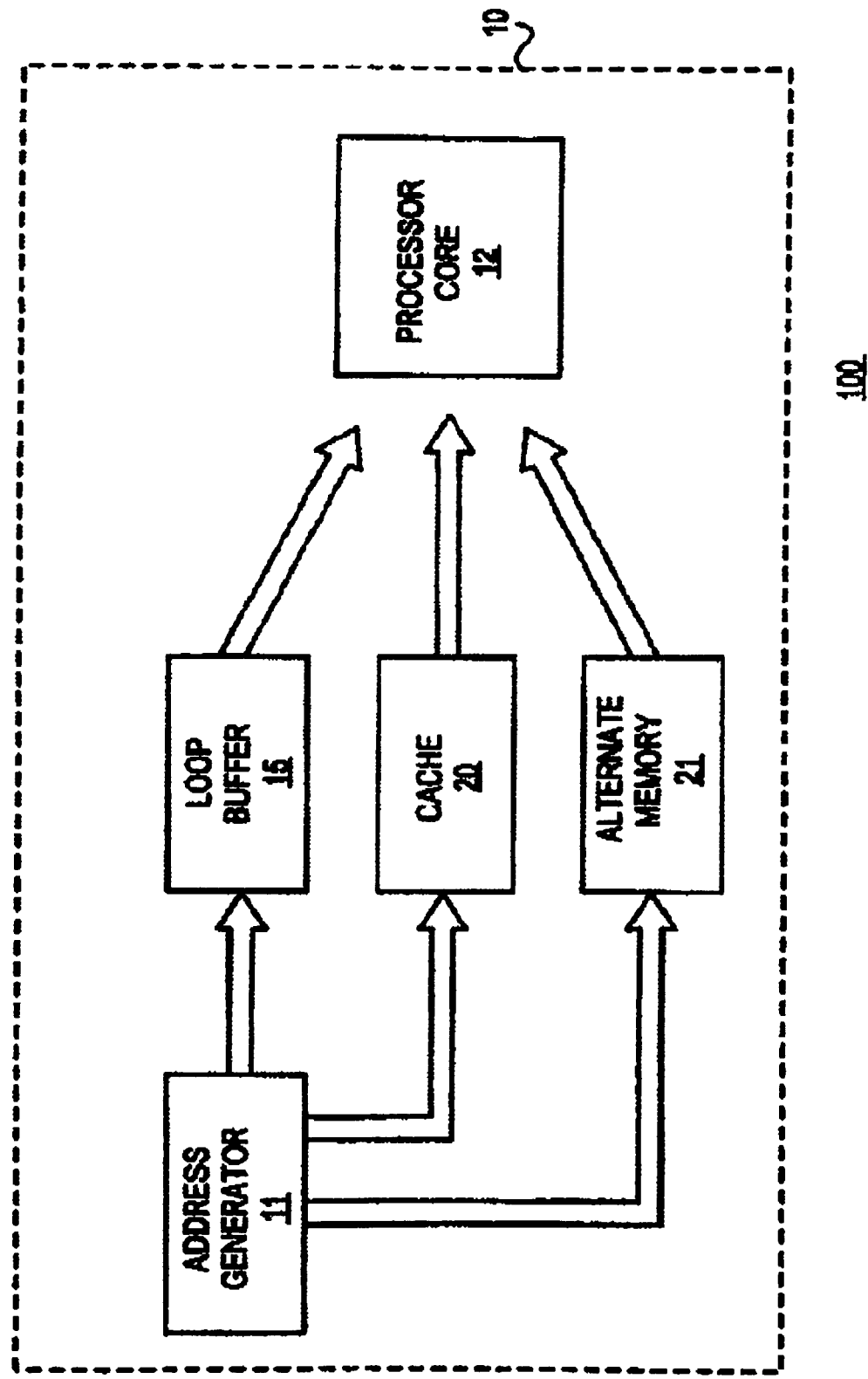
FIG. 1 is a schematic representation of an embodiment having a processor in accordance with an embodiment the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

Turning to FIG. 1, an embodiment 100 in accordance with the present invention is described in more detail hereinafter. Embodiment 100 may comprise a portable device, such as a mobile communication device (e.g., cell phone), a portable computer, or the like. However, it should be understood that the scope of the present invention is in no way limited to these particular applications.

Embodiment 100 here includes an integrated circuit 10 that may comprise, for example, a microprocessor, a digital signal processor, a microcontroller, or the like. However, it should be understood that the scope of the present invention is not limited to these examples. Integrated circuit 10 may include a processor core 12 that may, among other things, execute instructions to process data. While in operation, processor core 12 may request data, instructions, or a combination thereof. These requests may be made through an address generator that provides the identity or location, at least in part, or the information requested by processor core 12. As explained in more detail below, in particular embodiments of the present invention, the requested information may be provided by a loop buffer 15, a cache 20, or an alternate memory source 21.

As mentioned above, integrated circuit 10 may comprise a digital signal processor (DSP). DSPs may be used in arithmetically intensive applications such as, for example, in image processing or in wireless communication systems. Applications such as these may involve repetitious execution of the same or similar instructions (e.g., Multiply and accumulate (MAD), Sum of absolute differences (SAD), and the like). Instructions like these often involve the DSP entering a loop where the same or similar instructions are executed over and over again.

As explained in more detail below, embodiments of the present invention may take advantage of this characteristic by using a loop buffer to provide the requested data or instructions when processing core 12 may be repeatedly executing the same or similar instructions. The loop buffer memory storage location that may contain all or part of the instruction or data that is executed by processing core 12, for example, the instruction being repeatedly executed in a loop. The use of a loop buffer may save the time and power consumption associated with retrieving the data or instruction(s) from a cache. In the embodiments that follow, the term "instruction" may refer to any information requested by a processor during an instruction cycle including, but not limited to, data, registers, op codes, function calls, parity bits, etc. If the information requested by processing core 12 is not in loop buffer 15, then cache 20 may provide the information. The use of cache 20 may offer the advantage of improved processor throughput because processor core 12 does not have to wait for the information to be retrieved from an alternate memory source 21.

Figure 2:
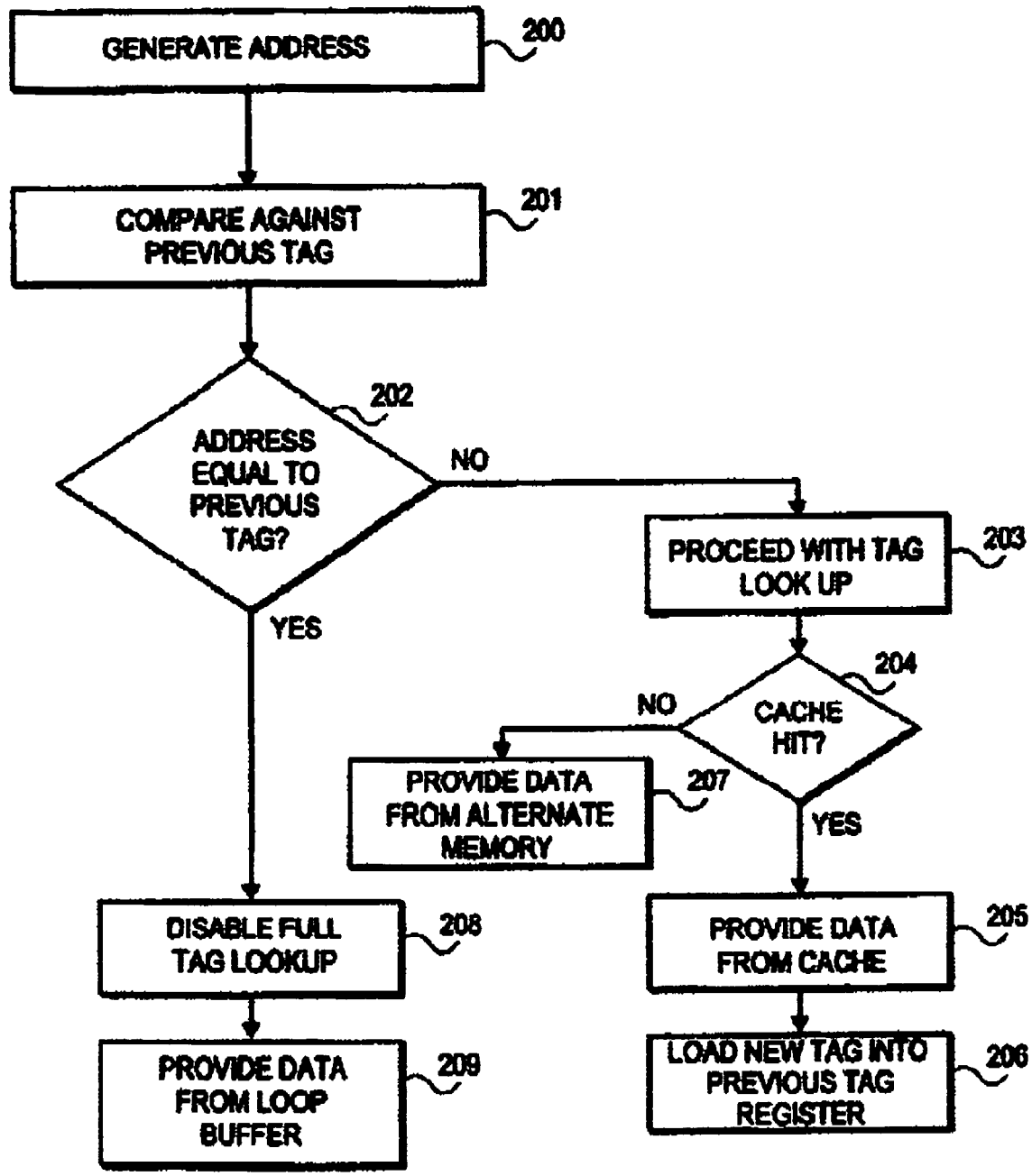
FIG. 2 is a flow chart of a method that may be used in accordance with particular embodiments the present invention.

FIG. 2 is provided to demonstrate a method of providing an instruction and/or data in accordance with embodiments of the present invention. The request for data or an instruction begins by generating the address of the information requested, block 200. The address generated may provide, in whole or part, the location or identity of the information requested by a processor core (e.g., processor core 12, see FIG. 1). It should be understood that the scope of the present invention is in no way limited to a technique or implementation for generating the address. Many available approaches will prove satisfactory.

The address may then be compared against a logic value stored in a loop buffer (e.g., loop buffer 15, see FIG. 1) to determine the if the information requested is located in the loop buffer. For example, the generated address may be compared to the logic value stored in a previous tag register, block 201. The tag register may be, for example, a dedicated memory location, although the scope of the present invention is in no way limited in this respect. In alternative embodiments of the present invention, the address provided by the address generator may be compared, either in whole or part, against the tag addresses stored in one or more tag fields. If the address requested is substantially equal to, either in whole or part, the information stored in the previous tag register, this suggests that the processor core has requested an instruction that may be the same or similar to the last instruction executed, block 202. Thus, the processor core may be in a loop (e.g., repeatedly executing the same or similar instruction). If the address is sufficiently equal to the logic value stored in the previous tag register, it may be concluded or determined that the location or identity of the information requested by the processor core may be the same or similar to the one previously requested. It should be understood that "substantially equal" does not necessarily mean that the logic values compared are exactly identical. Two logic values may be sufficiently equal even if one or more respective bits within the logic value are not the same.

By first determining if the requested information may be stored in a loop buffer, particular embodiments of the present invention may avoid the need to do a search of a cache and avoid the need to retrieve the information from an alternate memory source. If the information is in the loop buffer (e.g., loop buffer 15 of FIG. 1), the search through the cache may be disabled, block 208. This, in turn, saves the time and power consumption associated with searching through either the cache or tag fields associated with the cache. Since the information may be in the loop buffer, the requested information may be provided to the processor core directly from the loop buffer, block 209.

If the address does not sufficiently correspond to the logic value stored in the previous tag register, then the information may be not available from the loop buffer and the tag look up process may begin to determine if the information is in the cache, block 203.

The address generated may be compared to those stored in a tag array or may be directly compared against the values stored in the cache, block 204. If the information is in the cache, then a cache "hit" has occurred and the information requested may be provided by the cache, block 205. Although not intended to be a requirement of all embodiments of the present invention, if the information is provided by the cache, then the information may also be stored in the loop buffer, block 206. This may be achieved, for example, by loading, in whole or part, the previous tag register with the information provided by the address generator. In alternative embodiments, an index register may be loaded with a logic value corresponding to the location of the information in the cache. This may make the information more readily available should this be the information that the processor core requests in the future. For example, the information may be available in the loop buffer for subsequent requests for information when the method illustrated in FIG. 2 is repeated for another instruction cycle.

If the information is not stored in the cache, then a cache "miss" has occurred. Consequently, the information may be retrieve from an alternate memory source such as lower level memory (e.g. dynamic random access memory (DRAM), read-only memory (ROM), or the like), or from external sources such as disk drives, etc, block 207. However, embodiments of the present invention do not require any particular alternate memory source and the scope of the present invention is not limited to the type of alternate memory available.

Figure 3:
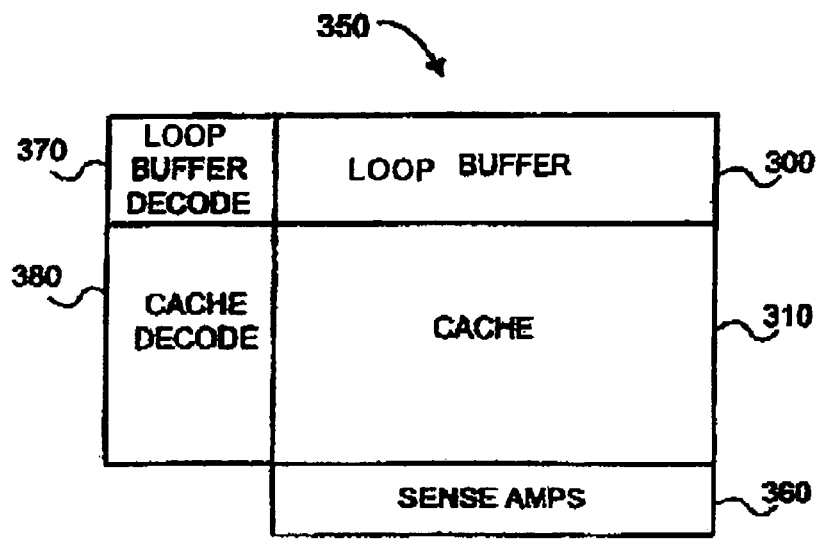
FIGS. 3-4 are block diagram representations of particular embodiments of the present invention.
Figure 4:
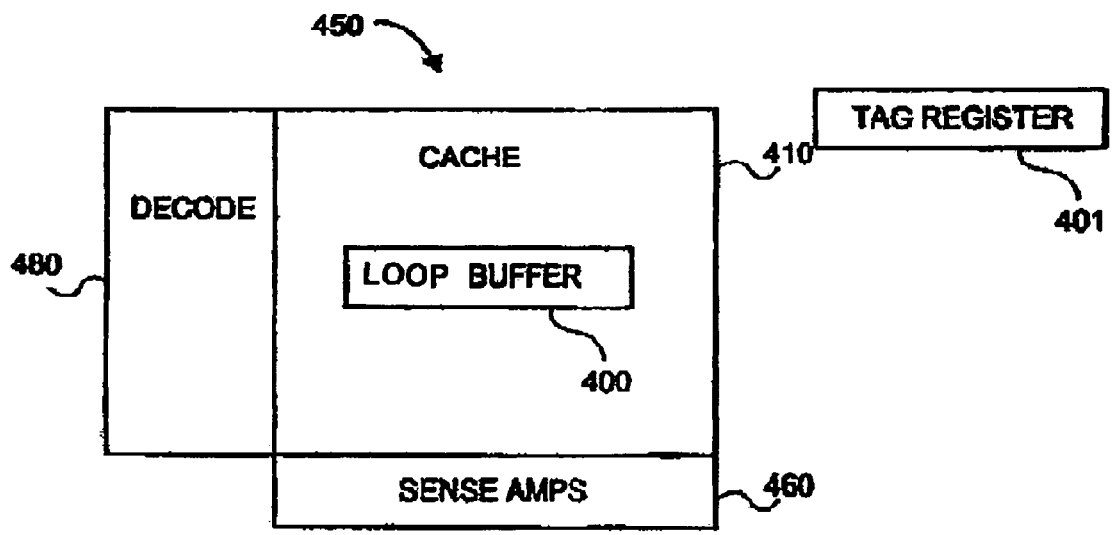

Turning to FIGS. 3 and 4, implementations of a loop buffer and a cache in accordance with particular embodiments of the present invention are provided, although the scope of the present invention is not limited to the embodiments shown. In FIG. 3, a loop buffer 300 and a cache 310 are provided with a memory array 350. Memory array 350 may be an array of static random access memory (SRAM) arranged in rows and columns. This is only meant to be illustrative, as memory array 350 may be arranged in a variety of ways and be implemented in DRAM, ROM, electrically erasable and programmable ROM (EEPROM), or the like, or any combination thereof.

As shown in FIG. 3, memory array 350 may be divided into at least two portions that may be contiguous; one providing loop buffer 300 and the other providing cache 310. In this particular embodiment, the physical location of loop buffer 300 within memory array 350, and relative to cache 310, is fixed. Memory array 350 may have a loop buffer decode logic 370 and a cache decode logic 380 that are used to select the location within loop buffer 300 and cache 310, respectively. Sense amps 360 may be used to read the information stored in loop buffer 300 and cache 310.

This particular embodiment may offer an advantage in that when the requested information is in loop buffer 300, it may be possible to disable the transistors associated with cache decode 380. Furthermore, in this embodiment, the actual and logical location of the information stored in loop buffer 300 is fixed and known. Consequently, these features may reduce the time it takes to provide the processor core with the requested information and save the power associated with cache decode logic 380.

FIG. 4 provides an alternative implementation of a memory array 450 that may provide a loop buffer 400 and a cache 410. In this particular embodiment of the present invention, the physical and logical location of loop buffer 410 within memory array 450 may change with time as the information stored in loop buffer 400 changes. This particular embodiment includes a tag register 401 that may be used to keep track of the physical location of loop buffer 400 by containing the logical information regarding the location of loop buffer 400 within memory array 450. For example, tag register 401 may include the address, either in whole or part, of loop buffer 400 within memory array 450. Alternatively, tag register 401 may comprise an index value that may be used to retrieve the information stored within loop buffer 400.

One advantage of this particular embodiment is that it may provide for efficient loading of information in loop buffer 400. As explained above, if requested information is not contained in the loop buffer, it may be desirable to load the loop buffer with the information so that it may be available for future requests (see FIG. 2, block 206). In this embodiment, this may be achieved by reloading tag register 401 with the logic value corresponding to the location of the requested information within memory array 450.

This particular embodiment of the present invention may also offer an improvement in power consumption because loop buffer 400 may be used to provide the processor core with the requested information. If the information is stored in loop buffer 400, it may not be necessary to search through cache 410. This may be possible because the information stored in tag register 401 may be used to control how much of decode logic 480 and sense amps 460 are used to retrieve the information in memory array 450. For example, only the portions of decode logic 480 and sense amps 460 that correspond to loop buffer 400 may be enabled so that the power may be saved.

Figure 5:
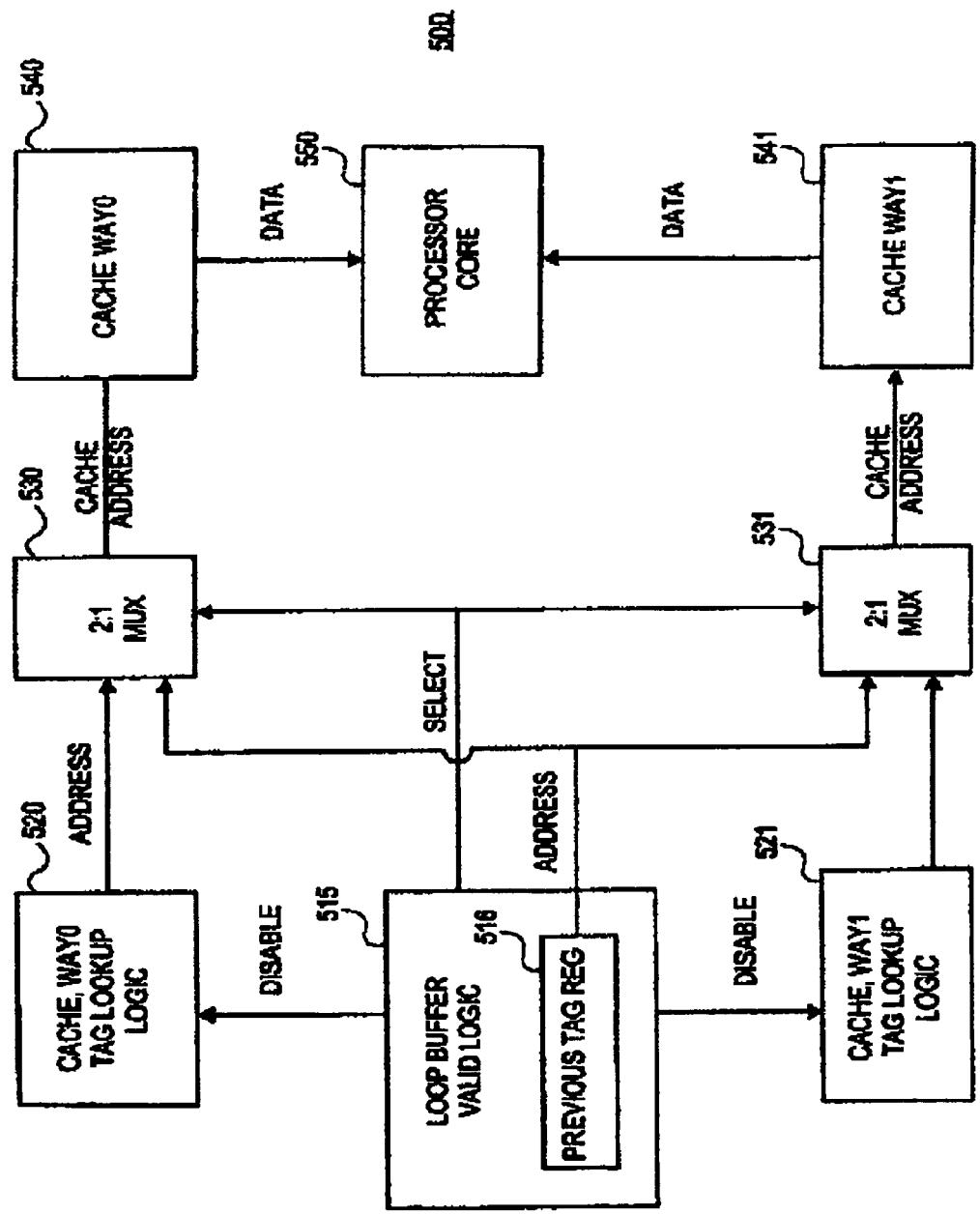
FIG. 5 is a block diagram representation of an implementation of a particular embodiment of the present invention.

FIG. 5 is provided to illustrate yet another embodiment in accordance with the present invention. FIG. 5 illustrates an example of how a loop buffer may be used to disable the tag look-up logic of a cache if the requested information is stored in a loop buffer. As shown, embodiment 500 includes a cache that may be partitioned into sub-sets or ways (e.g., cache way0 540 and cache way1 541). Although the scope of the present invention is not limited so as to require the use of cache ways, in some applications, it may be desirable to divide a cache in to sub-regions or ways to improve the cache hit rate. The actual number of sub-regions or ways may vary as desired.

A loop buffer valid logic block 515 may determine if a requested piece of information is contained within the loop buffer. This may be done, for example, by comparing the address of the requested information against the address in a previous tag register 516. If the information is in the loop buffer, then loop buffer valid logic 515 may disable the tag look up for cache way0 and cache way 1. By disabling the tag look up, this particular embodiment may reduce the amount of power consumed as compared to conventional techniques.

If the requested information is in the loop buffer, previous tag register 516 may be used to provide the address information to Muxes 530 and 531. Control signals from loop buffer valid logic block 515 may be used to select which address Muxes 530 and 531 provide to cache way0 540 and cache way1 541. Again, the number of sub-sets or ways in the cache is not a limitation of the scope of the present invention and may be adjusted as desired. The cache address provided by Muxes 530 and 531 allow cache way0 and cache way1 to provide processor core 550 with the requested data.

By now it should be appreciated that the present invention provides embodiments that may improve the performance of a processor while consuming less power than some conventional techniques. Applicant has recognized the repetitive nature of some processors, such as DSPs, and developed a loop buffer that provides requested information to the processor core. In some embodiments, the loop buffer may not only provide the requested information, but may save the power associated with doing a search of a cache for the same information.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. An apparatus, comprising a memory array comprising a loop buffer and a cache;
   means for determining if at least a portion of an instruction is stored in the loop buffer; and
   means for determining if at least a portion of the instruction is stored in the cache;
   said means for determining if at least a portion of the instruction is in a loop buffer comprising means for determining if at least a portion of the instruction is in first portion of a memory array, and said means for determining if at least a portion of the instruction is in the cache comprising means for determining if at least a portion of the instruction is in a second portion of the memory array.

2. An apparatus as claimed in claim 1, said means for determining if at least a portion of the instruction is in a loop buffer comprising means for determining if at least a portion of an address corresponding to the instruction is substantially equal to a tag address.

3. An apparatus as claimed in claim 1, said means determining if at least a potion of the instruction is in a loop buffer comprising means for comparing at least a potion of an address corresponding to the instruction with at least a portion of a logic value stored in a tag register.

4. An apparatus as claimed in claim 1, said means for determining if at least a portion of the instruction is in a loop buffer comprising means for determining if at least a portion of the instruction is in first portion of a memory array, and said means for determining if at least a portion of the instruction is in the cache comprising means for determining if at least a portion of the instruction is in a second portion of the memory array, the first portion of the memory array being substantially contiguous with the second portion of the memory array.

5. An apparatus as claimed in claim 1, further comprising means for loading a tag register after said means for determining if at least a portion of the instruction is stored in a cache determines at least a portion of the instruction is in the cache.

6. An apparatus as claimed in claim 5, said means for loading the tag register comprising means for loading a logic value that corresponds at least in part to a storage location in a memory array.

7. An apparatus as claimed in claim 6, further comprising means for determining if at least a portion of an additional instruction is in a loop buffer, and means for determining if at least a portion of the additional instruction corresponds to the logic value in the tag register.

8. An apparatus, comprising:
   a memory array comprising a loop buffer and a cache;
   means for determining if a first piece of data is in the loop buffer;
   means for enabling a portion of the memory array corresponding to the loop buffer; and
   means for determining if a second piece of data is in the cache if the second piece of data is not in the loop buffer.

9. An apparatus as claimed in claim 8, said means for enabling a portion of the memory array comprising means for enabling only the portion of the memory array comprising the first piece of data.

10. An apparatus as claimed in claim 8, further comprising:
    means for enabling the memory array if the second piece of data is not in the loop buffer.

11. An apparatus as claimed in claim 8, further comprising:
    means for loading a tag register with a first logic value corresponding, at least in part, to a location of the second piece of data in the memory array.

12. An apparatus as claimed in claim 11, further comprising:
    means for determining if a third piece of data is stored in the loop buffer and means for determining if the first logic value stored in the tag register corresponds, at least in part, to the third piece of data.

13. An apparatus as claimed in claim 12, further comprising:
    means for determining if the third piece of data is in the memory array if the third piece of data is not in the loop buffer; and
    means for loading the tag register with a second logic value corresponding, at least in part, to a location of the third piece of data in the memory array.

14. An apparatus as claimed in claim 13, said means for loading the tag register with the second logic value comprises means for loading the tag register with a logic value that is different than the first logic value.

15. An apparatus as claimed in claim 8, said means for determining if the second piece of data is in the cache comprises means for determining if the second piece of data is in the memory array.

16. An apparatus as claimed in claim 8, further comprising:
    means for disabling a tag look-up of the memory array.

17. An apparatus as claimed in claim 8, further comprising:
    means for providing at least a portion of the first piece of data to a digital signal processing core.

* * * * *